(12) United States Patent
Yasuda

(10) Patent No.: US 12,225,135 B2
(45) Date of Patent: Feb. 11, 2025

(54) ACCESS CONTROL APPARATUS, CONTROL METHOD, AND NON-TRANSITORY COMPUTER READABLE MEDIUM

(71) Applicant: NEC Corporation, Tokyo (JP)

(72) Inventor: Takashi Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 17/783,077

(22) PCT Filed: Dec. 20, 2019

(86) PCT No.: PCT/JP2019/050161
§ 371 (c)(1),
(2) Date: Jun. 7, 2022

(87) PCT Pub. No.: WO2021/124568
PCT Pub. Date: Jun. 24, 2021

(65) Prior Publication Data
US 2023/0024635 A1    Jan. 26, 2023

(51) Int. Cl.
*H04L 9/32* (2006.01)
*H04L 9/00* (2022.01)

(52) U.S. Cl.
CPC ............ *H04L 9/3231* (2013.01); *H04L 9/321* (2013.01); *H04L 9/50* (2022.05)

(58) Field of Classification Search
CPC .......... H04L 9/321; H04L 9/3231; H04L 9/50
See application file for complete search history.

(56) References Cited

U.S. PATENT DOCUMENTS

2018/0060496 A1* 3/2018 Bulleit ................. H04L 9/0643
2019/0294817 A1* 9/2019 Hennebert ........... H04L 9/0861

FOREIGN PATENT DOCUMENTS

| CN | 107480555 A | 12/2017 |
| CN | 109286616 A | 1/2019 |
| JP | 2013-045278 A | 3/2013 |
| JP | 2017-195627 A | 10/2017 |
| JP | 2018-081464 A | 5/2018 |

OTHER PUBLICATIONS

International Search Report for PCT Application No. PCT/JP2019/050161, mailed on Mar. 10, 2020.
JP Office Action for JP Application No. 2021-565303, mailed on Jul. 18, 2023 with English Translation.

* cited by examiner

*Primary Examiner* — William S Powers
(74) *Attorney, Agent, or Firm* — Sughrue Mion, PLLC

(57) ABSTRACT

An access control apparatus (2000) acquires a request (20) for access to data stored in a first storage apparatus 30. The access control apparatus (2000) acquires privilege information (70) from a blockchain storage (40). The privilege information (70) represents access privilege pertaining to access to the first storage apparatus (30). The access control apparatus (2000) determines whether requested access is within a range of the access privilege of a target entity (10) being a subject of the request (20), by using the privilege information (70) of the target entity (10). When it is determined that the access is within the range of the access privilege of the target entity (10), the access control apparatus (2000) executes the access.

7 Claims, 6 Drawing Sheets

FIG. 5

| ENTITY IDENTIFICATION INFORMATION | OBJECT IDENTIFICATION INFORMATION | PRIVILEGE INFORMATION |
|---|---|---|
| user001 | file001 | read |
| ... | ... | ... |
| ugroup001 | dir001 | write |
| ... | ... | ... |
| terminal001 | file002 | read, write |
| ... | ... | ... |
| tgroup001 | region001 | read |
| ... | ... | ... |

ACCESS CONTROL APPARATUS, CONTROL METHOD, AND NON-TRANSITORY COMPUTER READABLE MEDIUM

This application is a National Stage Entry of PCT/JP2019/050161 filed on Dec. 20, 2019, the contents of all of which are incorporated herein by reference, in their entirety.

TECHNICAL FIELD

The present invention relates to data sharing.

BACKGROUND ART

Data sharing has been performed by storing data in a storage apparatus accessible from a plurality of terminals. As one of storage apparatuses for use in such data sharing, a blockchain storage achieved by using a blockchain technique is known. For example, Patent Document 1 discloses sharing information pertaining to an event that has occurred in a terminal by storing the information in a blockchain storage.

RELATED DOCUMENT

Patent Document

[Patent Document 1] Japanese Patent Application Publication No. 2018-081464

DISCLOSURE OF THE INVENTION

Technical Problem

A blockchain storage has an advantage that it is difficult to tamper stored data. On the other hand, since it is also difficult to delete stored data from a blockchain storage, once data (e.g., personal information) that the owner may desire to delete later is stored in the blockchain storage, it may be difficult to handle the data when the owner desires to delete the data.

The present invention has been made in view of the above-described problem, and one of objects of the present invention is to provide a technique for utilizing a blockchain storage, while enabling data deletion.

Solution to Problem

An access control apparatus according to the present invention includes 1) a request acquisition unit that acquires a request for access to data stored in a first storage apparatus, 2) a privilege information acquisition unit that acquires, from a second storage apparatus in which privilege information representing access privilege pertaining to access to the first storage apparatus is stored, the privilege information, 3) a privilege determination unit that determines whether the access is within a range of the access privilege of a target entity being a subject of the request, by using the privilege information of the target entity, and 4) an access execution unit that executes the access, when the access is determined to be within a range of the access privilege of the target entity. The second storage apparatus is a blockchain storage.

A control method according to the present invention is executed by a computer. The control method includes 1) a request acquisition step of acquiring a request for access to data stored in a first storage apparatus, 2) a privilege information acquisition step of acquiring, from a second storage apparatus in which privilege information representing access privilege pertaining to access to the first storage apparatus is stored, the privilege information, 3) a privilege determination step of determining whether the access is within a range of the access privilege of a target entity being a subject of the request, by using the privilege information of the target entity, and 4) an access execution step of executing the access, when the access is determined to be within a range of the access privilege of the target entity. The second storage apparatus is a blockchain storage.

A program according to the present invention causes a computer to execute the control method according to the present invention.

Advantageous Effects of Invention

The present invention provides a technique for utilizing a blockchain storage, while enabling data deletion.

BRIEF DESCRIPTION OF THE DRAWINGS

FIG. 5 is a diagram illustrating privilege information stored in a second storage apparatus in a table format.

DESCRIPTION OF EMBODIMENTS

Hereinafter, an example embodiment according to the present invention is described with reference to the drawings. Note that, in all of the drawings, a similar constituent element is designated by a similar reference sign, and description thereof will not be repeated as appropriate. Further, in each block diagram, each block represents a configuration of a functional unit instead of a configuration of a hardware unit unless otherwise specifically described. In the following description, a predetermined value (such as a threshold value) of each kind is stored in advance in a storage apparatus accessible from a functional configuration unit using the value unless otherwise specifically described.

Example Embodiment 1

Overview

Figure 1:
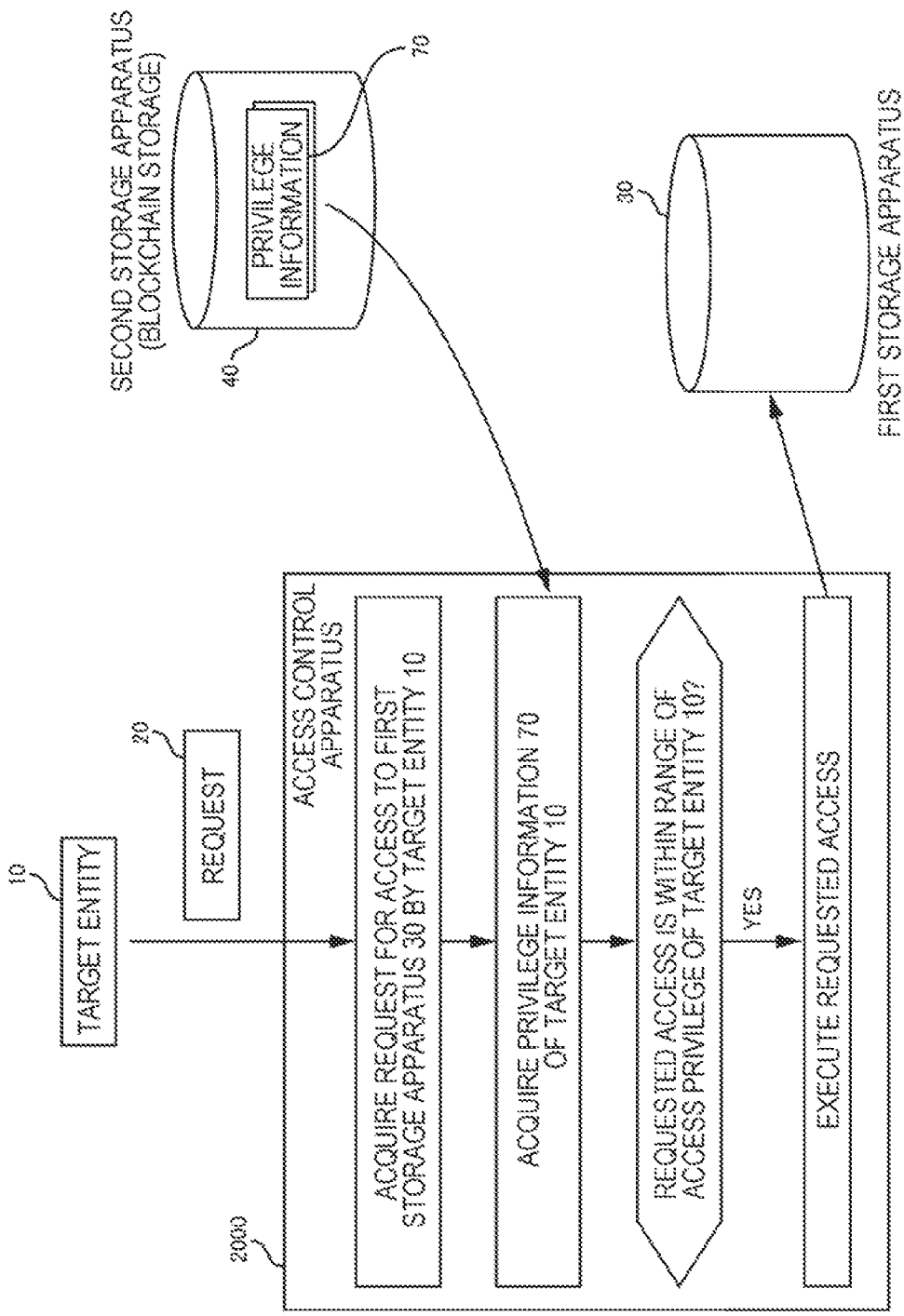
FIG. 1 is a diagram conceptually illustrating an operation of an access control apparatus according to an example embodiment 1.

FIG. 1 is a diagram conceptually illustrating an operation of an access control apparatus 2000 according to an example embodiment 1. Herein, an operation of the access control apparatus 2000 described using FIG. 1 is an example for facilitating understanding of the access control apparatus 2000, and does not limit an operation of the access control apparatus 2000. Details and variations of an operation of the access control apparatus 2000 are described later.

The access control apparatus 2000 controls access to a first storage apparatus 30, which is requested from an entity, based on access privilege granted to the entity. An entity referred to herein is a subject that requests access to the first storage apparatus 30. For example, an entity is a user, or a group of users. In this case, access privilege is set for each user or for each group of users. In addition to the above, for example, an entity is a terminal, or a group of terminals. In this case, access privilege is set for each terminal or for each group of terminals. Note that, a terminal may be a physical machine, or may be a virtual machine.

Any data are stored in the first storage apparatus 30. What is stored in the first storage apparatus 30 is, for example, authentication information of a user for use in user authentication, personal information of a user, and the like.

Information (privilege information 70) representing access privilege of each entity is stored in a second storage apparatus 40. The second storage apparatus 40 is a storage (blockchain storage) configured by using a blockchain technique. Note that, an existing technique can be used as a technique for configuring a blockchain storage. Hereinafter, the second storage apparatus 40 is also described as a blockchain storage 40. Herein, the first storage apparatus 30 is not a blockchain storage.

The access control apparatus 2000 accepts a request for access to data stored in the first storage apparatus 30. Hereinafter, an entity being a subject of a request received by the access control apparatus 2000 is referred to as a target entity 10. The access control apparatus 2000 acquires privilege information 70 of a target entity 10. The access control apparatus 2000 determines whether a requested access is within a range of access privilege granted to a target entity 10 by using privilege information 70 of the target entity 10.

When determining that a requested access is within a range of access privilege granted to a target entity, the access control apparatus 2000 executes the requested access. On the other hand, when determining that a requested access is not within a range of access privilege granted to a target entity, the access control apparatus 2000 does not executes the requested access.

One Example of Advantageous Effect

In the access control apparatus 2000 according to the present example embodiment, it is determined whether execution of a requested access to the first storage apparatus 30 is permitted by using privilege information 70 stored in the blockchain storage 40. Herein, a blockchain storage has an advantage that it is difficult to tamper stored data. Therefore, it is difficult to tamper privilege information 70 stored in the blockchain storage 40, and it can be said that the privilege information 70 is information having high reliability. Thus, with the access control apparatus 2000, it is possible to prevent data stored in the first storage apparatus 30 from being illegitimately accessed by a target entity 10 which does not have legitimate access privilege.

Herein, a method of storing data themselves to be accessed in the blockchain storage 40 is also conceived. However, it is not only difficult to tamper data in a blockchain storage, but also difficult to delete data. Therefore, once a user stores data to be shared with another person in a blockchain storage, it may be impossible to delete the data, even when the user desires to delete the data. For example, when the data are personal information of the user, an inconvenience may occur in which a "right to be forgotten" in a general data protection regulation (GDPR) cannot be accomplished.

In this regard, the access control apparatus 2000 stores privilege information 70 representing access privilege in the blockchain storage 40, and stores data to be accessed in the first storage apparatus 30, which is not a blockchain storage. By doing so, it also becomes possible to, by utilizing an advantage of a blockchain storage, delete data, while preventing tampering of privilege information 70 and occurrence of an illegitimate access to data. Thus, it is possible to achieve secure data sharing utilizing an advantage of a blockchain storage, while enabling data deletion.

Hereinafter, the access control apparatus 2000 is described in more detail.

Example of Functional Configuration

Figure 2:
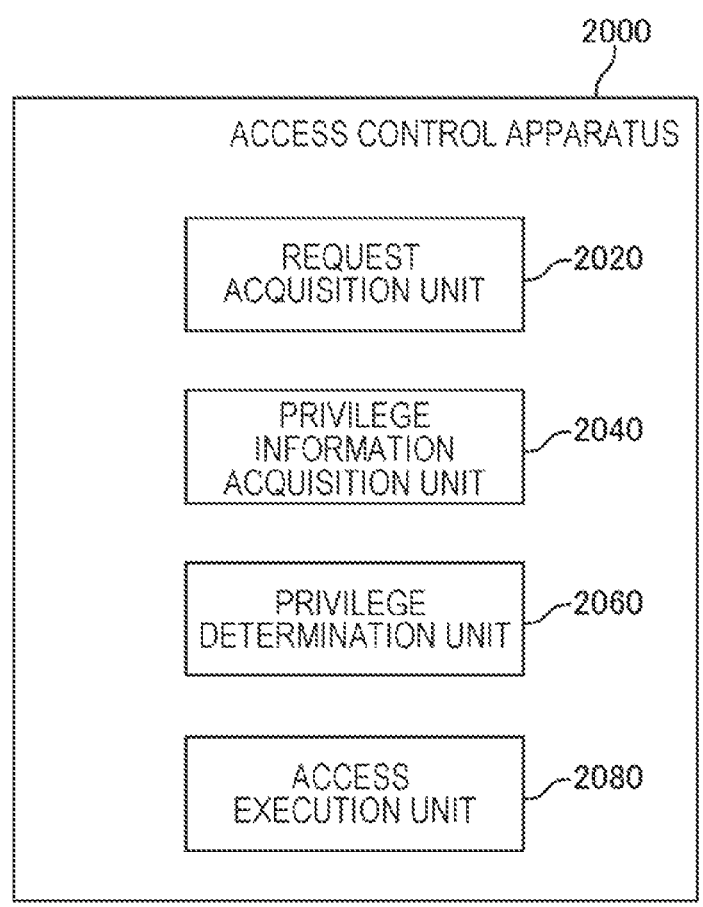
FIG. 2 is a block diagram illustrating a functional configuration of the access control apparatus.

FIG. 2 is a block diagram illustrating a functional configuration of the access control apparatus 2000. The access control apparatus 2000 includes a request acquisition unit 2020, a privilege information acquisition unit 2040, a privilege determination unit 2060, and an access execution unit 2080. The request acquisition unit 2020 acquires a request 20. The request 20 is a request for access to the first storage apparatus 30 by a target entity 10. The privilege information acquisition unit 2040 acquires, from the second storage apparatus 40, privilege information 70 indicating access privilege of the target entity 10. The privilege determination unit 2060 determines whether the access indicated by the request 20 is within a range of access privilege of the target entity 10 by using the privilege information 70. When it is determined that the access is within the range of the access privilege, the access execution unit 2080 executes the access indicated by the request 20. Note that, the first storage apparatus 30 is not a blockchain storage, and the second storage apparatus 40 is a blockchain storage.

Example of Hardware Configuration of Access Control Apparatus 2000

Each functional configuration unit of the access control apparatus 2000 may be achieved by hardware (example: a hard-wired electronic circuit, and the like) for achieving each functional configuration unit, or may be achieved by combination of hardware and software (example: combination of an electronic circuit and a program for controlling the electronic circuit, and the like). Hereinafter, a case where each functional configuration unit of the access control apparatus 2000 is achieved by combination of hardware and software is further described.

Figure 3:
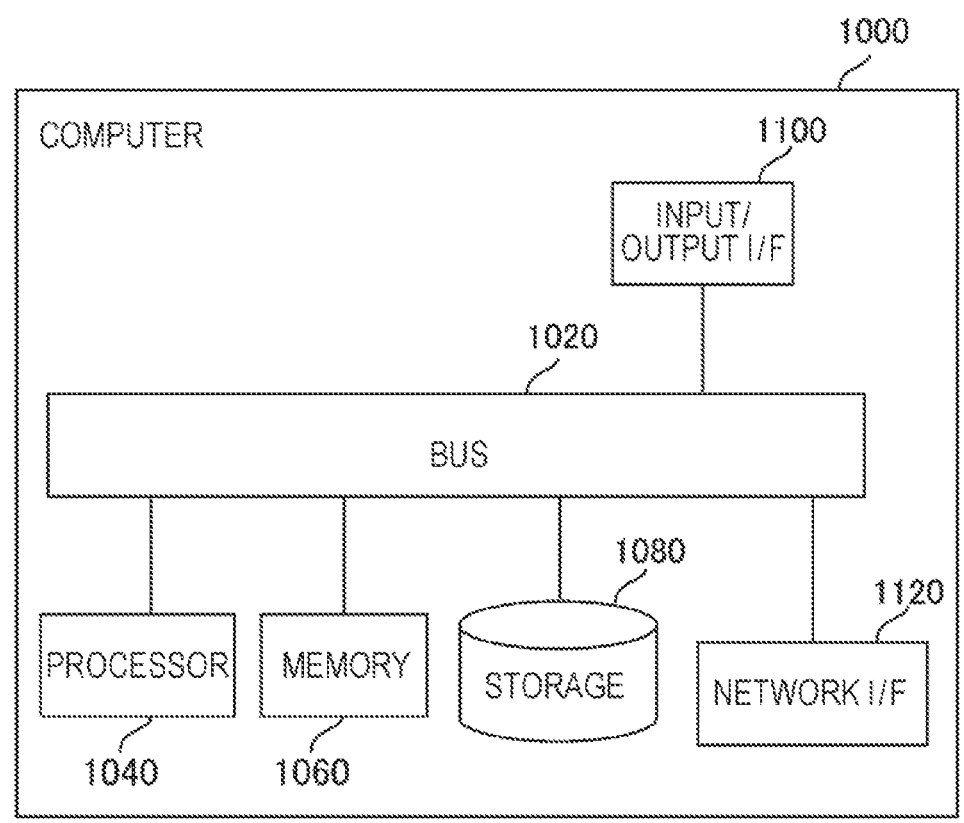
FIG. 3 is a diagram illustrating a computer for achieving the access control apparatus.

FIG. 3 is a diagram illustrating a computer 1000 for achieving the access control apparatus 2000. The computer 1000 is any computer. For example, the computer 1000 is a stationary computer such as a personal computer (PC) or a server machine. In addition to the above, for example, the computer 1000 is a portable computer such as a smartphone or a tablet terminal.

The computer 1000 may be a dedicated computer designed for achieving the access control apparatus 2000, or may be a general-purpose computer. In the latter case, for example, the computer 1000 achieves each function of the access control apparatus 2000 by installing a predetermined application in the computer 1000. The above-described application is configured of a program for achieving a functional configuration unit of the access control apparatus 2000.

The computer 1000 includes a bus 1020, a processor 1040, a memory 1060, a storage device 1080, an input/output interface 1100, and a network interface 1120. The bus 1020 is a data transmission path along which the processor 1040, the memory 1060, the storage device 1080, the input/output interface 1100, and the network interface 1120 mutually transmit and receive data. However, a method of mutually connecting the processor 1040 and the like is not limited to bus connection.

The processor 1040 is various processors such as a central processing unit (CPU), a graphics processing unit (GPU), and a field-programmable gate array (FPGA). The memory 1060 is a main storage apparatus to be achieved by using a random access memory (RAM) or the like. The storage device 1080 is an auxiliary storage apparatus to be achieved by using a hard disk, a solid state drive (SSD), a memory card, a read only memory (ROM), or the like.

The input/output interface 1100 is an interface for connecting the computer 1000 to an input/output device. For example, the input/output interface 1100 is connected to an input apparatus such as a keyboard, and an output apparatus such as a display apparatus.

The network interface 1120 is an interface for connecting the computer 1000 to a communication network. The communication network is, for example, a local area network (LAN) or a wide area network (WAN).

The storage device 1080 stores a program (program for achieving the above-described application) for achieving each functional configuration unit of the access control apparatus 2000. The processor 1040 achieves each functional configuration unit of the access control apparatus 2000 by reading the program into the memory 1060 and executing the program.

Flow of Processing

Figure 4:
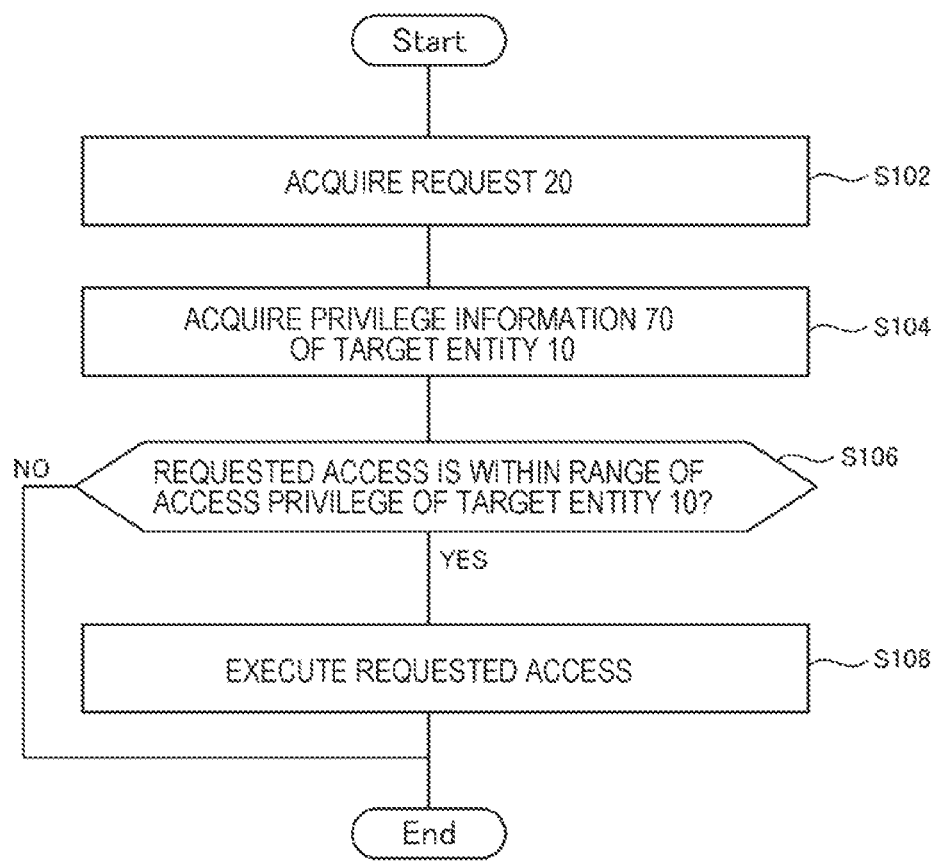
FIG. 4 is a flowchart illustrating a flow of processing to be executed by the access control apparatus according to the example embodiment 1.

FIG. 4 is a flowchart illustrating a flow of processing to be executed by the access control apparatus 2000 according to the example embodiment 1. The request acquisition unit 2020 acquires a request 20 (S102). The privilege information acquisition unit 2040 acquires privilege information 70 of a target entity 10 (S104). The privilege determination unit 2060 determines whether access requested by the request 20 is within a range of access privilege of the target entity 10 (S106). When the access is within the range of the access privilege (S106: YES), the access execution unit 2080 executes the access requested by the request 20 (S108).

When the access is not within the range of the access privilege (S106: NO), processing in FIG. 4 is ended. However, also in this case, the access control apparatus 2000 may perform some processing. For example, as will be described later, the access control apparatus 2000 outputs a notification representing that the requested access is not within a range of access privilege.

Regarding Privilege Information 70

Access privilege with respect to the first storage apparatus 30 is represented by privilege information 70. The privilege information 70 is defined with respect to a combination of a subject and an object of access. As described above, a subject of access is an entity. For example, privilege information 70 defined with respect to a combination of "an entity A, an object B" represents access privilege of the entity A with respect to access to the object B.

An object of access can be represented by various methods. For example, an object of access is represented by data stored in the first storage apparatus 30. In this case, access privilege is set with respect to a combination of "entity identification information, identification information of data (data identification information)". According to this method, access privilege can be set in a unit of a piece of data.

Herein, any information capable of mutually identifying data can be used as data identification information. For example, in a case where data are managed as a file, data identification information is a file name or a path. In addition to the above, for example, in a case where data are managed in a table, data identification information is information for determining a piece of data within the table.

In addition to the above, for example, an object of access is represented by a group of pieces of data stored in the first storage apparatus 30. In this case, access privilege is set with respect to a combination of "entity identification information, identification information of a data group (data group identification information)". According to this method, access privilege can be set in a unit of a group of pieces of data.

In addition to the above, for example, an object of access may be represented by a partial storage area (hereinafter, a partial area) within the first storage apparatus 30. In this case, access privilege is set with respect to a combination of "entity identification information, identification information of a partial area (area identification information)". According to this method, access privilege can be set in a unit of a partial area.

For example, a partial area is allocated to a specific user. A user stores data in the allocated partial area. By enabling to set access privilege in a unit of a partial area, a user is enabled to permit only a specific entity to access to the partial area allocated to himself or herself.

Note that, an access privilege setting method (i.e., a generation method of privilege information 70) is described later.

FIG. 5 is a diagram illustrating privilege information 70 stored in the second storage apparatus 40 in a table format. A table in FIG. 5 is referred to as a table 100. The table 100 includes three columns called entity identification information 102, object identification information 104, and privilege information 70. The entity identification information 102 indicates identification information of an entity. The object identification information 104 indicates identification information of an object (data identification information, data group identification information, or area identification information). The privilege information 70 represents privilege of an entity to be determined by the associated entity identification information 102 with respect to an object to be determined by the associated object identification information 104. In the privilege information 70 in FIG. 5, "read" indicates that an entity has reading privilege, "write" indicates that an entity has writing privilege, and "read, write" indicates that an entity has both of reading privilege and writing privilege. Note that, execution privilege may be settable, in addition to the reading privilege and the writing privilege.

Herein, setting of access privilege (i.e., registration of a record in the table 100) may be performed via the access control apparatus 2000, or may be performed without the access control apparatus 2000. In the former case, for example, the access control apparatus 2000 provides a user with a website or the like that accepts a setting of access privilege. A user performs a setting of access privilege by inputting necessary information in the website. The access control apparatus 2000 stores, in the blockchain storage 40, access privilege (a record in the table 100) specified by a user. Note that, an existing technique can be used as a technique for storing data in a blockchain storage.

Acquisition of Request 20: S102

The request acquisition unit 2020 acquires a request 20. For example, a request 20 is transmitted from any terminal communicably connected to the access control apparatus 2000. In this case, the access control apparatus 2000 is achieved by a server machine, or the like communicably connected to a terminal to be operated by a user. In addition to the above, for example, the request acquisition unit 2020 may accept an input of a request 20 using an input device connected to the access control apparatus 2000. In this case, the access control apparatus 2000 is achieved by a terminal or the like to be operated by a user.

A request 20 includes at least entity identification information of a target entity 10, and information (hereinafter, access content information) representing a content of access. The entity identification information is information to be used for identifying entities one from another. For example, in a case where a user is handled as an entity, identification information of the user, identification information of a user group to which the user belongs, and the like can be used as entity identification information. In a case where a terminal is used as an entity, identification information (address information such as an IP address and a MAC address, and the like) of the terminal, identification information (such as identification information of a network group) of a terminal group to which the terminal belongs, and the like can be used as entity identification information.

Access content information represents a content of access to be requested by a request 20. For example, access content information includes data identification information of data to be accessed, and a kind of access with respect to the data. A kind of access is reading, writing, and the like. Further, in a case where a kind of access is writing, access content information further includes a content of writing.

Note that, as described above, privilege information 70 may be associated with a group of pieces of data, or a partial area. In view of the above, identification information of a group of pieces of data, or a partial area may be used for determination of presence or absence of access privilege. In this case, access content information further indicates group identification information of a group to which data to be accessed belong, or area identification information of a partial area in which data to be accessed are stored. By checking access privilege of a group or a partial area, a time required for determining presence or absence of access privilege can be shortened at a time of accessing a plurality of pieces of data included in the group or the partial area.

Acquisition of Privilege Information 70: S104

The privilege information acquisition unit 2040 acquires privilege information 70 (S104). As described above, privilege information 70 is defined with respect to a combination of a subject (entity) and an object of access. In view of the above, the privilege information acquisition unit 2040 acquires privilege information 70 associated with a combination of pieces of identification information of a subject and an object indicated in a request 20.

In a request 20, identification information of a subject of access is entity identification information of a target entity. On the other hand, identification information of an object of access is, for example, data identification information included in access content information. However, as described above, a request 20 may include data group identification information or area identification information. In this case, data group identification information or area identification information is used as identification information of an object of access.

Regarding Acquisition Source of Privilege Information 70

As described above, privilege information 70 is stored in the blockchain storage 40. In view of the above, for example, the privilege information acquisition unit 2040 acquires, from the blockchain storage 40, privilege information 70 associated with a combination of pieces of identification information of a subject and an object indicated in a request 20.

However, the privilege information acquisition unit 2040 may make a copy of a part or all of pieces of information stored in the blockchain storage 40 in advance in another storage apparatus (hereinafter, a third storage apparatus), and acquire, from the third storage apparatus, privilege information 70 to be acquired in response to a request 20. Access from the access control apparatus 2000 to the third storage apparatus may preferably be performed at a high speed, as compared with access from the access control apparatus 2000 to the blockchain storage 40. In this way, by making a copy of privilege information 70 in advance in a storage apparatus accessible at a high speed, determination on access privilege can be performed at a higher speed. The third storage apparatus is, for example, a storage apparatus provided within the access control apparatus 2000.

The privilege information acquisition unit 2040 synchronizes a content of the third storage apparatus and a content of the blockchain storage 40. Note that, an existing technique can be used as a specific technique for synchronizing contents of two storage apparatuses.

Determination on Access Privilege: S106

The privilege determination unit 2060 determines whether access requested by a request 20 is within a range of access privilege of a target entity 10 by using privilege information 70 (S106). More specifically, the privilege determination unit 2060 determines whether access of a kind indicated in access content information is permitted by acquired privilege information 70. In a case where the access is permitted, it is determined that the access is within the range of the access privilege of the target entity 10. On the other hand, in a case where the access is not permitted, it is determined that the access is not within the range of the access privilege of the target entity 10.

Herein, as described above, a request 20 may indicate, as an object for determining access privilege, identification information of a data group or a partial area. In this case, privilege information 70 associated with identification information of a data group or a partial area is acquired. In view of the above, for example, the privilege determination unit 2060 performs two determinations, for a pair of "data, a kind of access to the data", which is indicated by access content information, 1) whether the data belong to a data group or a partial area used for determination of access privilege, and 2) whether the access of the kind is permitted in privilege information 70.

In a case where the data indicated by the access content information belong to a data group or a partial area used for determination of access privilege, and the access of the kind indicated by the access content information is permitted in the privilege information 70, the privilege determination unit 2060 determines that the requested access is within the range of the access privilege of the target entity 10. On the other hand, in a case where the data indicated by the access content information do not belong to a data group or a partial area used for determination of access privilege, or the access of the kind indicated by the access content information is not permitted in the privilege information 70, the privilege determination unit 2060 determines that the requested access is not within the range of the access privilege of the target entity 10.

Note that, the privilege determination unit 2060 may not perform the determination 1), and may restrict a range in which the access execution unit 2080 searches for data to be accessed in the first storage apparatus 30 to a data group or a partial area used for determination of access privilege. By doing so, in a case where data indicated by access content information do not belong to a data group for which determination on access privilege is performed, or are not stored in a partial area for which determination on access privilege is performed, the access execution unit 2080 cannot find the data, and thereby fails to access the data. Thus, also with use of this method, it is possible to prevent access from being performed in a range other than a range of access privilege.

Control of Access Based on Determination Result: S108

When it is determined that requested access is within a range of access privilege of a target entity 10 (S106: YES), the access execution unit 2080 executes the requested access (S108). On the other hand, when it is determined that requested access is not within a range of access privilege of a target entity 10 (S106: NO), the access execution unit 2080 does not execute the access indicated by a request 20.

In the latter case, for example, the access execution unit 2080 outputs a notification that the requested access cannot be executed because of absence of access privilege. In a case where a request 20 is transmitted from another terminal to the access control apparatus 2000, the access control apparatus 2000 transmits the notification to the another terminal. On the other hand, in a case where a request 20 is input to the access control apparatus 2000 by using an input device or the like, the access control apparatus 2000 outputs a notification to a display apparatus or the like connected to the access control apparatus 2000.

Note that, the access execution unit 2080 may output a predetermined notification (such as a notification that access has been completed), also in a case where a requested access could be executed. An output destination of a notification is similar to that of a notification in a case where requested access could not be executed.

Examples

For example, the access control apparatus 2000 can be used for identity verification of a user who is about to use a predetermined service. Hereinafter, the access control apparatus 2000 for use in identity verification is described as an example of the access control apparatus 2000. However, the following description is only an example, and a way of usage of the access control apparatus 2000 is not limited to identity verification of a user.

Figure 6:
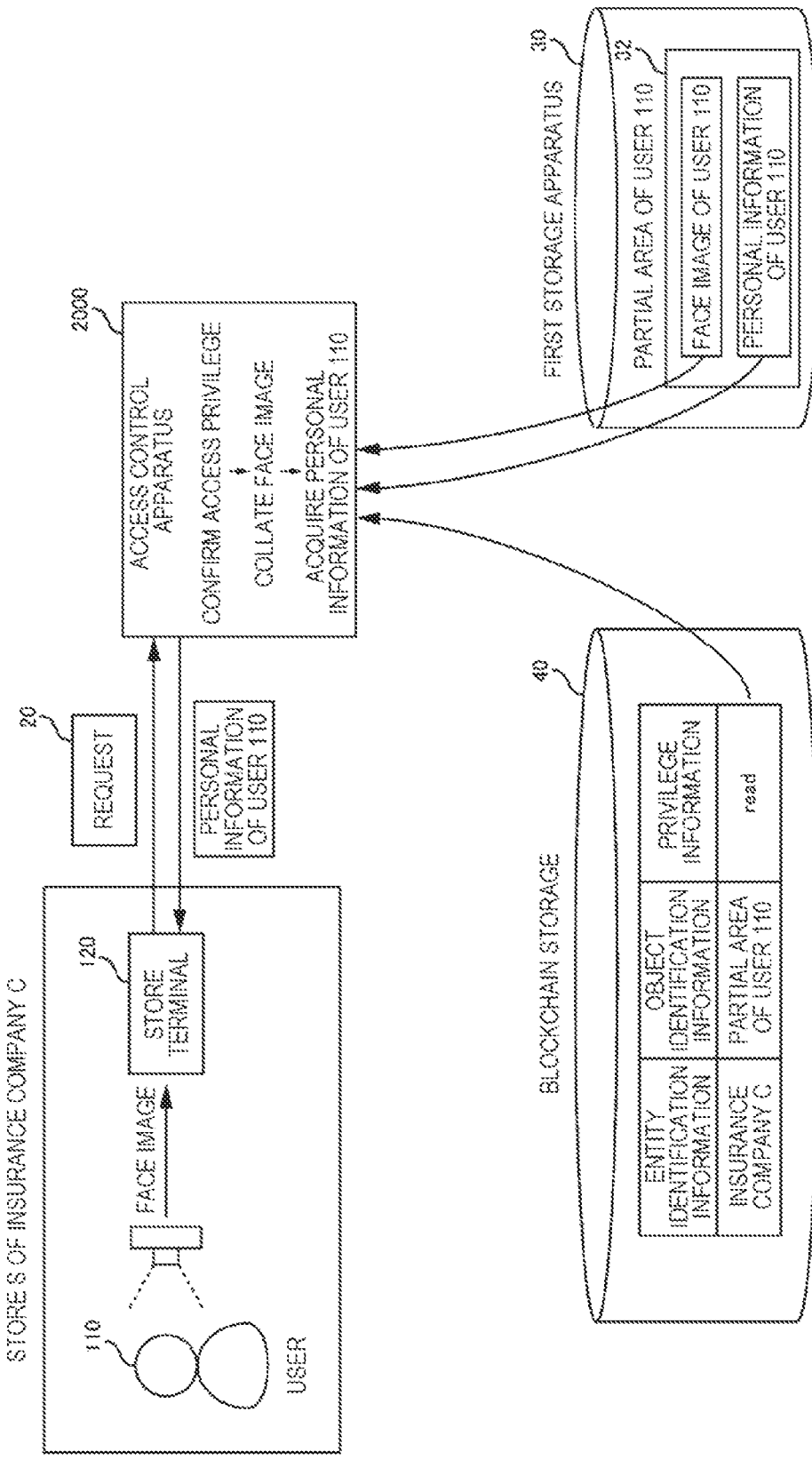
FIG. 6 is a diagram illustrating an access control apparatus according to an example.

FIG. 6 is a diagram illustrating the access control apparatus 2000 according to an example. In this example, a user 110 performs a procedure of taking out insurance provided by an insurance company C. At this occasion, the insurance company C needs to acquire legitimate personal information (such as a name and an address) of the user 110. In view of the above, for example, the insurance company C receives provision of personal information from the user 110 at a store S, and also performs confirmation (i.e., identity verification) that the personal information is legitimate personal information of the user 110. In other words, confirmation as to whether the user 110 does not provide false personal information is performed.

To achieve identity verification using the access control apparatus 2000, information usable for identity verification of a user is stored in advance in the first storage apparatus 30. Specifically, personal information of a user is stored in the first storage apparatus 30 in association with authentication information of the user. Authentication information of a user is any information usable for user authentication, and is, for example, biometric information such as a face image, account information (a pair of a user name and a password), and the like. In the example in FIG. 6, a face image being one kind of pieces of biometric information is used as authentication information.

For example, authentication information and personal information of a user are stored in a partial area 32 allocated to the user in the first storage apparatus 30. In other words, a piece of authentication information and a piece of personal information stored in the same partial area 32 are pieces of information associated with each other. Privilege information 70 is defined in association with identification information of the partial area 32.

The user 110 using the insurance company C provides in advance, to the insurance company C, reading privilege with respect to the partial area 32 of the user 110. Specifically, privilege information 70 indicating reading permission is stored in the blockchain storage 40 in association with a combination of "a subject=the insurance company C, an object=the partial area 32 of the user 110".

For example, identity verification of the user 110 is performed according to the following flow. First, the user 110 goes to the store S of the insurance company C. Then, the user 110 provides a store terminal 120 at the store S with authentication information of the user 110, and area identification information of the partial area 32 of the user 110. In the example in FIG. 6, a face image of the user 110 is provided to the store terminal 120 by capturing a face of the user 110 with use of a camera installed in the store terminal 120.

The store terminal 120 transmits a request 20 to the access control apparatus 2000. The request 20 indicates, as entity identification information of a target entity 10, identification information of the insurance company C, and indicates, as access content information, "reading a face image". Further, for determination on access privilege, the request 20 indicates area identification information of the partial area 32 of the user 110.

The privilege information acquisition unit 2040 acquires privilege information 70 associated with "a subject=identification information of the insurance company C, an object=area identification information of the partial area 32 of the user 110". The privilege determination unit 2060 determines whether a requested access is within a range of access privilege of the insurance company C by determining whether reading is permitted in the acquired privilege information 70.

As described above, the user 110 provides in advance, to the insurance company C, reading privilege with respect to the partial area 32 of the user 110. Therefore, the requested access is determined to be within the range of the access privilege of the insurance company C. Then, the access execution unit 2080 reads, from the partial area 32 of the user 110, a face image of the user 110.

The access control apparatus 2000 collates a face image acquired from the store terminal 120 (face image acquired by capturing the user 110 at the store S) with a face image acquired from the partial area 32 (determines whether the face images indicate a same person). When the face images are determined to indicate a same person, personal information stored in the partial area 32 can be said to be legitimate personal information of the user 110. In view of the above, the access control apparatus 2000 acquires personal information of the user 110 from the partial area 32 of the user 110, and provides the personal information to the store terminal 120. On the other hand, when the face images are determined not to indicate a same person, the access control apparatus 2000 transmits, to the store terminal 120, an error notification that authentication has failed. Note that, an existing method can be used as a method of determining whether two face images indicate a same person. For example, the access control apparatus 2000 computes a similarity between two face images, and compares the similarity with a predetermined threshold value. In a case where the similarity is equal to or more than the predetermined threshold value, the two face images are determined to indicate a same person, and in a case where the similarity is less than the predetermined threshold value, the two face images are determined not to indicate a same person.

When personal information of the user 110 is acquired from the access control apparatus 2000, the store terminal 120 determines whether personal information provided from the user 110 matches the personal information provided from the access control apparatus 2000 (i.e., personal information read from the partial area 32 of the user 110). When these pieces of information match each other, the store terminal 120 determines that the personal information provided from the user 110 at the store S is legitimate. Specifically, it is possible to confirm that the user 110 who visited the store S of the insurance company S is a person himself or herself.

Note that, the store terminal 120 may not necessarily perform the above-described confirmation on matching of personal information. For example, confirmation on matching of personal information may be performed by the access control apparatus 2000. In this case, the store terminal 120 also transmits personal information provided from the user 110 to the access control apparatus 2000. Then, the access control apparatus 2000 performs confirmation as to whether the personal information provided from the store terminal 120 (i.e., personal information provided from the user 110 at the store S) matches personal information acquired from the partial area 32 of the user 110.

Further, the store terminal 120 does not have to acquire personal information from the user 110. For example, in this case, the user 110 writes personal information on an application form or the like. Then, a staff member at the store S confirms identity verification of the user 110 by referring to personal information in the partial area 32 of the user 110, which is displayed on the store terminal 120 via the access control apparatus 2000, and comparing with the personal information written in the application form.

In addition to the above, for example, the insurance company C may not ask the user 110 to input or fill in personal information, and may use, as personal information of the user 110, personal information acquired from the access control apparatus 2000 by the store terminal 120 according to the above-described flow. In this case, the user 110 can automatically provide personal information, once the user 110 provides authentication information such as a face image. Therefore, time and labor for input of personal information by a user are reduced. Further, it is possible to prevent occurrence of an input error of personal information.

In a case where identity verification is successful according to the above-described flow, the access control apparatus 2000 may store, in the partial area 32 of the user 110, information (hereinafter, confirmation information) representing that legitimacy of a pair of authentication information and personal information of the user 110 is confirmed. For example, confirmation information includes identification information of a company, a government agency, and the like (hereinafter, a company and the like) that have performed identity verification. Hereinafter, a company and the like that have performed identity verification is also described as a confirmer.

By storing such confirmation information, another company and the like to be used by the user 110 thereafter can efficiently perform determination and the like as to whether a service is to be provided to the user 110 by using a fact that identity verification has already been performed regarding the user 110. For example, examples are exemplified: 1) an agency that issues a passport stores, in the partial area 32, confirmation information representing that passport data stored in the partial area 32 of a user are legitimate, 2) an agency that issues a driver's license stores, in the partial area 32, confirmation information representing that data on a driver's license stored in the partial area 32 of a user are legitimate, 3) a company that provides a settlement service stores, in the partial area 32, confirmation information representing that information (such as a settlement remaining capacity) pertaining to a settlement service stored in the partial area 32 of a user is legitimate, and the like.

Further, confirmation information may further include information representing a result of various procedures and the like that have been performed after identity verification. For example, in the above-described example of an insurance company, information pertaining to an insurance contract signed after identity verification can be included in confirmation information.

Note that, to prevent information in which identity verification has been performed from being rewritten thereafter, an electronic signature of a confirmer may be attached to the information in which identity verification has been performed. For example, once legitimacy on a pair of authentication information and personal information of the user 110 is confirmed, an electronic signature generated by using a private key of a confirmer is attached to the pair. Specifically, confirmation information including identification information of a confirmer, and data attached with the above-described electronic signature is stored in the partial area 32 of the user 110.

Thereafter, another company and the like that desire to use authentication information and personal information of the user 110 acquire the above-described confirmation information from the partial area 32 of the user 110, and perform decryption of the electronic signature attached to the data included in the confirmation information by using a public key of the confirmer determined by identification information indicated in the confirmation information. Thus, it is possible to confirm that the data attached with the electronic signature included in the confirmation information are not updated after identity verification, and a fact that another confirmer admits legitimacy of the personal information. Note that, an existing method can be used as a specific method of confirming, by using an electronic signature, that data rewriting has not been performed.

Hereinafter, specific cases of using confirmation information are exemplified.

Case 1 of Using Confirmation Information

For example, it is assumed that the user 110 uses a rental car. In this case, the user 110 makes a reservation for a rental car in advance at a website provided by a car rental company X. At a time of making a reservation, the user 110 provides authentication information and personal information. Consequently, reservation information including authentication information of a user, personal information of the user, a reservation date and time, a kind of a car for use, and the like is stored in a reservation management server of the car rental company X. Further, the user 110 provides the car rental company X with reading privilege with respect to the partial area 32 of the user 110. Then, on the day when the user 110 uses a rental car, the user 110 goes to a store Y of the car rental company X.

The user 110 performs a rental procedure at the store Y. Specifically, first, a store terminal R at the store Y reads, from a server, reservation information pertaining to the user 110. For this reason, the store terminal R acquires authentication information from the user 110, and transmits the authentication information to the reservation management server. For example, the reservation management server determines, from among pieces of the reservation information in which the reservation date and time indicates the day, a piece of information that indicates authentication information matching the authentication information provided from the store terminal R, and provides the piece of information to the store terminal R.

Further, the store terminal R performs identity verification of the user 110. Specifically, the store terminal R acquires or refers to personal information of the user 110 from the partial area 32 of the user 110, and confirms whether the personal information matches personal information included in the reservation information. Note that, a flow of processing of acquiring or referring to personal information of the user 110 from the partial area 32 of the user 110 is similar to the flow described in the above-described case of the insurance company C.

Further, in the present case, confirmation information is stored in the partial area 32 of the user 110 by the above-described insurance company C. The confirmation information can also include information pertaining to an insurance contract signed with respect to the user 110, in addition to identification information of the insurance company C. By using the confirmation information, the car rental company X can acquire information whose legitimacy is guaranteed by the insurance company C, regarding the insurance taken out by the user 110.

For example, the car rental company X enables to check whether it is necessary for the user 110 to take out temporary insurance to use a rental car, by referring to information on the insurance taken out by the user 110.

Case 2 of Using Confirmation Information

For example, confirmation information can be used for cashless settlement. For this reason, the user 110 performs application for a settlement service with respect to a company Z (e.g., a credit card company) that provides a settlement service, by using biometric information (authentication information) stored in the first storage apparatus 30. Consequently, confirmation information including information on a settlement service provided by the company Z is stored in the partial area 32 of the user 110. Note that, an "application for a settlement service" herein may be newly applying for a settlement service provided by the company Z, or may be an additional application that makes it possible to perform settlement only by biometric information without a medium such as a credit card of the company Z, in a condition in which the user 110 already uses the medium.

Once a settlement service becomes available, the user 110 shops at a store where the settlement service can be used. A settlement terminal P1 at a store acquires biometric information of the user 110 (e.g., captures a face of the user 110 by a camera) for performing settlement. The settlement terminal P1 transmits, to the access control apparatus 2000, a request including the biometric information. After confirming access privilege, the access control apparatus 2000 acquires biometric information from the partial area 32 of the user 110, and performs collation with respect to the biometric information of the user 110 provided from the settlement terminal P1.

When it is determined that the biometric information of the user 110 provided from the settlement terminal P1, and the biometric information acquired from the partial area 32 of the user 110 indicate a same person (i.e., authentication is successful), the access control apparatus 2000 acquires confirmation information stored in the partial area 32 by the company Z, and provides the confirmation information to the settlement terminal P1. The settlement terminal P1 performs settlement by using information on the settlement service included in the confirmation information. By a flow as described above, the user 110 can perform settlement without providing a medium such as cash or a card.

Note that, to achieve the above-described settlement service, it is necessary to set access privilege in such a way that data can be read from the partial area 32 of the user 110 in response to a request from the above-described settlement terminal P1. In view of the above, for example, an entity representing a group of each store that accepts a settlement service provided by the company Z is prepared, and access privilege for reading from the partial area 32 is granted to the entity. A settlement terminal at each store that accepts a settlement service provided by the company Z transmits a request, as the above-described entity, at a time of transmitting a request 20 to the access control apparatus 2000. By doing so, access privilege can be set all at once with respect to a plurality of stores.

Case 3 of Using Confirmation Information

For example, confirmation information is used for achieving a mobility as a service (MaaS). In the MaaS, it becomes possible to receive a group of services spreading over different business operators, in a case where a user travels by transfer of transportation such as an airplane, a train, or a bus provided by each business operator. For example, a service is provided in which various transportations in a specific range can be freely used at a fixed price throughout a day.

For example, the user 110 signs a usage contract on the above-described MaaS service according to a flow similar to the above-described flow of signing an insurance contract with the insurance company C. A usage contract on a service herein is a contract for enabling to freely use each transportation provided in a specified range during a specified period. Once the service contract is completed, confirmation information including a contract content of the service usable by the user is stored in the partial area 32 of the user 110.

To use the above-described service, the user 110 provides authentication information to a settlement terminal P2 installed in a vehicle V (the settlement terminal P2 captures a face of the user 110 by a camera). The settlement terminal P2 transmits, to the access control apparatus 2000, a request 20 including the acquired authentication information. When authentication is successful, the access control apparatus 2000 reads the above-described confirmation information from the partial area 32, and provides the confirmation information to the settlement terminal P2.

The settlement terminal P2 refers to the contract content of the service included in the acquired confirmation information, and determines whether use of the vehicle V is within the range of the contract. In a case where the use of the vehicle V is within the range of the contract, the settlement terminal P2 permits the user 110 to use the vehicle V without asking payment of a fee to the user 110 (e.g., opens an entrance gate). On the other hand, in a case where the use of the vehicle V is not within the range of the contracted service, the settlement terminal P2 requests the user 110 to pay the fee.

Note that, to achieve the above-described MaaS service, it is necessary to set access privilege in such a way that data can be read from the partial area 32 of the user 110 in response to a request from the settlement terminal P2. In view of the above, for example, an entity representing a group of business operators of each transportation joining the above-described MaaS service is prepared, and access privilege for reading from the partial area 32 is provided to the entity. A settlement terminal or the like of each transportation joining the MaaS service transmits a request, as the above-described entity, at a time of transmitting a request 20 to the access control apparatus 2000. By doing so, access privilege can be set all at once with respect to a plurality of business operators.

A part or all of the above-described example embodiments may also be described as the following supplementary notes, but is not limited to the following.

1. An access control apparatus including:
   a request acquisition unit that acquires a request for access to data stored in a first storage apparatus;
   a privilege information acquisition unit that acquires, from a second storage apparatus in which privilege information representing access privilege pertaining to access to the first storage apparatus is stored, the privilege information;
   a privilege determination unit that determines whether the access is within a range of the access privilege of a target entity being a subject of the request, by using the privilege information of the target entity; and
   an access execution unit that executes the access, when the access is determined to be within a range of the access privilege of the target entity, in which the second storage apparatus is a blockchain storage.
2. The access control apparatus according to supplementary note 1, in which
   authentication information of a user is stored in the first storage apparatus,
   the access indicated by the request includes reading of the authentication information of a user,
   the request includes authentication information of a user to be authenticated, and
   the access execution unit performs authentication of the user to be authenticated by comparing the authentication information included in the request with the authentication information read by access to the first storage apparatus.
3. The access control apparatus according to supplementary note 2, in which the authentication information is biometric information.
4. The access control apparatus according to supplementary note 2 or 3, in which
   the access execution unit outputs a notification representing a result of the authentication, and
   the notification does not include authentication information acquired from the first storage apparatus.
5. The access control apparatus according to any one of supplementary notes 1 to 4, in which
   a partial storage area is allocated for each user in the first storage apparatus, and
   the privilege information representing access privilege of an entity with respect to the partial storage area is stored in the second storage apparatus in association with a combination of identification information of the entity and identification information of the partial storage area.
6. The access control apparatus according to supplementary note 5, in which
   authentication information and personal information of a first user are stored in the partial storage area of the first user, and
   the access execution unit stores confirmation information representing a result of confirmation in the partial storage area, when authentication of the first user is successful, and it is confirmed that the personal information of the first user is legitimate.
7. A control method to be executed by a computer, the method including:
   a request acquisition step of acquiring a request for access to data stored in a first storage apparatus;
   a privilege information acquisition step of acquiring, from a second storage apparatus in which privilege information representing access privilege pertaining to access to the first storage apparatus is stored, the privilege information;
   a privilege determination step of determining whether the access is within a range of the access privilege of a target entity being a subject of the request, by using the privilege information of the target entity; and
   an access execution step of executing the access, when the access is determined to be within a range of the access privilege of the target entity, in which
   the second storage apparatus is a blockchain storage.
8. The control method according to supplementary note 7, in which
   authentication information of a user is stored in the first storage apparatus,
   the access indicated by the request includes reading of the authentication information of a user, and
   the request includes authentication information of a user to be authenticated,
   the control method further including, in the access execution step, performing authentication of the user to be authenticated by comparing the authentication information included in the request with the authentication information read by access to the first storage apparatus.
9. The control method according to supplementary note 8, in which the authentication information is biometric information.
10. The control method according to supplementary note 8 or 9, further including,
    in the access execution step, outputting a notification representing a result of the authentication, in which
    the notification does not include authentication information acquired from the first storage apparatus.
11. The control method according to any one of supplementary notes 7 to 10, in which
    a partial storage area is allocated for each user in the first storage apparatus, and the privilege information representing access privilege of an entity with respect to the partial storage area is stored in the second storage apparatus in association with a combination of identification information of the entity, and identification information of the partial storage area.

12. The control method according to supplementary note 11, in which
authentication information and personal information of a first user are stored in the partial storage area of the first user,
the control method further including, in the access execution step, storing confirmation information representing a result of confirmation in the partial storage area, when authentication of the first user is successful, and it is confirmed that the personal information of the first user is legitimate.

13. A program causing a computer to execute the control method according to any one of supplementary notes 7 to 12.

REFERENCE SIGNS LIST

10 Target entity
20 Request
30 First storage apparatus
32 Partial area
40 Second storage apparatus, blockchain storage
70 Privilege information
100 Table
102 Entity identification information
104 Object identification information
110 User
120 Store terminal
1000 Computer
1020 Bus
1040 Processor
1060 Memory
1080 Storage device
1100 Input/output interface
1120 Network interface
2000 Access control apparatus
2020 Request acquisition unit
2040 Privilege information acquisition unit
2060 Privilege determination unit
2080 Access execution unit

What is claimed is:

1. An access control apparatus, comprising:
at least one memory storing instructions; and
at least one processor configured to execute the instructions to perform operations comprising:
acquiring a request from a first user for access to data of a second user stored in a data storage area of a first storage apparatus allocated for the second user, the request including first authentication information used for authentication of the second user;
acquiring privilege information from a second storage apparatus, the privilege information representing access privilege of the first user with respect to the data stored in the data storage area allocated for the second user;
determining whether the access is within a range of the access privilege of the first user, by using the privilege information of the first user;
executing the access to read second authentication information of the second user stored in the data storage area allocated for the second user, based on the access being determined to be within the range;
performing authentication of the second user by comparing the first authentication information with the second authentication information;
acquiring results of procedures after the authentication based on the authentication being successful; and
storing, in the data storage area allocated for the second user, the results of procedures in association with identification information of the first user, wherein
the second storage apparatus is a blockchain storage.

2. The access control apparatus according to claim 1, wherein
the first authentication information and the second authentication information comprise biometric information.

3. The access control apparatus according to claim 1, wherein
the operations further comprise outputting a notification representing a result of the authentication, and
the notification does not include the first authentication information.

4. A control method to be executed by a computer, comprising:
acquiring a request from a first user for access to data of a second user stored in a data storage area of a first storage apparatus allocated for the second user, the request including first authentication information used for authentication of the second user;
acquiring privilege information from a second storage apparatus, the privilege information representing access privilege of the first user with respect to the data stored in the data storage area allocated for the second user;
determining whether the access is within a range of the access privilege of the first user, by using the privilege information of the first user;
executing the access to read second authentication information of the second user stored in the data storage area allocated for the second user, based on the access being determined to be within the range;
performing authentication of the second user by comparing the first authentication information with the second authentication information;
acquiring results of procedures after the authentication based on the authentication being successful; and
storing, in the data storage area allocated for the second user, the results of procedures in association with identification information of the first user, wherein
the second storage apparatus is a blockchain storage.

5. The control method according to claim 4, wherein
the first authentication information and the second authentication information comprise biometric information.

6. The control method according to claim 4, further comprising,
outputting a notification representing a result of the authentication, wherein
the notification does not include authentication information acquired from the first storage apparatus.

7. A non-transitory computer readable medium storing a program causing a computer to execute operations, comprising:
acquiring a request from a first user for access to data of a second user stored in a data storage area of a first storage apparatus allocated for the second user, the request including first authentication information used for authentication of the second user;
acquiring, privilege information from a second storage apparatus, the privilege information representing access privilege of the first user with respect to the data stored in the data storage area allocated for the second user;

determining whether the access is within a range of the access privilege of the first user, by using the privilege information of the first user;

executing the access to read second authentication information of the second user stored in the data storage area allocated for the second user, based on the access being determined to be within the range;

performing authentication of the second user by comparing the first authentication information with the second authentication information;

acquiring results of procedures after the authentication based on the authentication being successful; and storing, in the data storage area allocated for the second user, the results of procedures in association with identification information of the first user, wherein the second storage apparatus is a blockchain storage.

* * * * *